(12) United States Patent
Strobel et al.

(10) Patent No.: US 7,379,239 B2
(45) Date of Patent: May 27, 2008

(54) ZERO-DEGREE ASSISTANT'S DEVICE FOR A MICROSCOPE

(75) Inventors: Peter Strobel, Grub (CH); Heinz Suhner, Rebstein (CH); Lothar Knuenz, Rankweil (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 148 days.

(21) Appl. No.: 11/378,601

(22) Filed: Mar. 17, 2006

(65) Prior Publication Data

US 2006/0215258 A1    Sep. 28, 2006

(30) Foreign Application Priority Data

Mar. 22, 2005  (DE) .................... 10 2005 013 296
Aug. 26, 2005  (DE) .................... 10 2005 040 580

(51) Int. Cl.
*G02B 21/00* (2006.01)
*G02B 21/18* (2006.01)

(52) U.S. Cl. .................... 359/384; 359/368; 359/372

(58) Field of Classification Search ......... 359/368–390
See application file for complete search history.

(56) References Cited

U.S. PATENT DOCUMENTS 5,668,661 A * 9/1997 Tomioka .................... 359/380
5,898,518 A    4/1999 Biber ........................ 359/385
6,421,173 B1 * 7/2002 Corbisiero et al. ......... 359/372
6,473,229 B2 * 10/2002 Nakamura .................. 359/377
7,002,738 B2 * 2/2006 Sturgis et al. .............. 359/384
7,265,899 B2 * 9/2007 Morita ....................... 359/384
2004/0252371 A1  12/2004 Sturgis et al. .............. 359/368

FOREIGN PATENT DOCUMENTS

JP     2005-137577    *  6/2005  ................. 359/368

OTHER PUBLICATIONS

English translation of the Japanese reference No. 2005-137577.*

* cited by examiner

*Primary Examiner*—Thong Nguyen
(74) *Attorney, Agent, or Firm*—Hodgson Russ LLP

(57) ABSTRACT

A zero-degree assistant's device for a microscope has a tube carrier (2) for the principal observer's tube, an interface (5) for the microscope body, an assistant's module (6), pivotable about an axis (4), having an interface (7) for an assistant's tube, and having a retaining device (8, 12) for releasing and immobilizing the assistant's module (6), the tube carrier (2) for the principal observer's tube being mounted tiltably about a rotation axis (10) in such a way that tilting of the tube carrier (2) for the principal observer's tube into a tilted position makes possible unrestricted pivoting of the assistant's module (6).

14 Claims, 5 Drawing Sheets

ZERO-DEGREE ASSISTANT'S DEVICE FOR A MICROSCOPE

CROSS REFERENCE TO RELATED APPLICATIONS

This application claims priority of the German patent application 10 2005 013 296.0 filed Mar. 22, 2006 and German patent application 10 2005 040 580.0 filed Aug. 26, 2005, both of which are incorporated by reference herein.

FIELD OF THE INVENTION

The present invention concerns a zero-degree assistant's device for a microscope, with which a portion of the optical beam path can be coupled out of the beam path for a principal observer and deflected into an assistant's device so that the acquired microscope image can be made accessible not only to the principal observer but also to a further observer (hereinafter called an "assistant"). Such systems are often used in surgical microscopes, in particular for opthalmology.

BACKGROUND OF THE INVENTION

Systems of the above-mentioned type allow an operation to be followed not only by the principal observer or lead surgeon, but also by an assistant. A known system is marketed, for example, by the Applicant under the designation "M841 EBS." In this known model, the zero-degree assistant's device is implemented as an insert that is inserted between the microscope body and the binocular tube for the principal observer. The zero-degree assistant's insert deflects a portion of the beam path into a corresponding assistant's tube, the beam paths in the assistant's tube and in the principal observer's tube being at a 90-degree angle to one another. With this known system, the microscope body contains the zoom systems as well as an illumination module for illuminating the object plane. In the known model, instead of the zero-degree assistant's insert it is also possible to use a "double-wing" insert that permits observation by two assistants standing opposite one another.

An examination is often documented as it proceeds. Provided for this purpose in the known model is a documentation module that can be inserted between the zero-degree assistant's insert and the binocular tube for the assistant. This documentation module in turn couples a portion of the beam path out and conveys it to specific image sensors. The image acquisition spectrum in this context ranges from conventional 35-mm photography to integrated 2D and 3D video systems.

The zero-degree assistant's insert is connected, via dovetail connections or other suitable connecting mechanisms, to the microscope body on the one side and to the binocular tube for the principal observer on the other. The documentation module is in turn connected, using corresponding connecting mechanisms, to the binocular tube for the assistant. During an examination or a procedure it is often necessary to change the position of the assistant. At present this can be done only by disassembling the corresponding modules or inserts, rotating the zero-degree assistant's insert 180 degrees (from left to right or right to left), and realigning and reinstalling the inserts or modules.

In the context of the surgical microscopes mentioned at the outset, it is extremely impractical, complex, time-consuming, and—not least—dangerous to disassemble, reorient, and reinstall the documentation module (if present) together with its documentation accessories, as well as the principal observer's tube and any laser filters, etc. that may be present, whenever the assistant changes sides, especially if the assistant needs to change sides during an operation. Lastly, the risk exists that the parts being disassembled and installed may collide or be dropped.

U.S. Pat. No. 5,898,518 discloses a stereomicroscope having an assistant's insert and a separate illumination module, the illumination module and the assistant's insert being able to assume at least two different positions by rotation about an axis. The construction of this microscope is such that the distance between the assistant's tube and the principal observer's tube must in any case always be sufficient to ensure collision-free rotation of the assistant's tube. The result of this, however, is that the microscope's overall height is undesirably high.

SUMMARY OF THE INVENTION

It is therefore the object of the present invention to described a zero-degree assistant's device for a microscope that allows the assistant to change sides easily.

This object is achieved, according to a first aspect of the invention, by a zero-degree assistant's device for a microscope having a tube carrier for the principal observer's tube, an interface for the microscope body, an assistant's module, pivotable about an axis, having an interface for an assistant's tube, and having a first and/or second retaining device for releasing and immobilizing the assistant's module, the tube carrier for the principal observer's tube being mounted rotatably about a tilt axis, rotation of the tube carrier for the principal observer's tube into a tilted position making possible unrestricted pivoting of the assistant's module.

Be it noted that the present invention is also applicable without restriction to assistant's devices in which, instead of an interface for an optical component, a fixed connection to that optical component is provided. The expression "interface for an assistant's tube" is consequently also to be understood to signify that the relevant assistant's tube is connected to or embodied with the assistant's module in fixed or integral fashion. The same applies to the tube carrier for the principal observer's tube, so that the tube carrier and principal observer's tube can also be connected fixedly to one another or embodied integrally.

The essence of the zero-degree assistant's device according to the present invention is consequently that the assistant can change sides without the disassembly of accessories, by the fact that the tube carrier having the principal observer's tube is swung into a tilted position while the surgical microscope is in use, and the zero-degree assistant's module together with the assistant's tube is then rotated from left to right (e.g. from 0° to 180°) or from right to left (e.g. from 180° to 0°) with no risk of collision with the principal observer's tube. The zero-degree assistant's device according to the present invention permits pivoting of the assistant's module without disassembly and re-alignment of the microscope elements connected thereto.

Upon rotation of the tube carrier into the tilted position while the microscope is in use, the elements mounted on the tube carrier (i.e. essentially the principal observer's tube) are also tilted, and can thus be brought into an adjustment position in which pivoting of the assistant's tube is enabled with no risk of collision with the principal observer's tube. It is advisable in this context if the tilt axis for the tube carrier extends substantially horizontally, while the pivot axis of the assistant's module extends substantially vertically. The retaining device serves principally to prevent unintentional pivoting. The invention allows pivoting of the assistant's module without increasing the overall height of the microscope.

In the context of the zero-degree assistant's device according to the present invention, provision is made for a first and/or a second retaining device. The two retaining devices can consequently be implemented separately from one another or else in combination with one another. In principle, each of the retaining devices serves to release and immobilize the assistant's module, thus preventing unintentional pivoting of the assistant's module, which would create a collision risk in particular during a surgical procedure, and would make observation of the microscopic image impossible.

The pivotable assistant's module is advantageously arranged beneath the tube carrier for the principal observer's tube, the tube carrier for the principal observer's tube being rotatable upward into a tilted position. When the microscope is in use, the assistant's module with the assistant's tube is consequently pivoted past the upwardly-swung principal observer's tube and underneath it, with no risk of collision.

An arrangement in which the pivotable assistant's module is arranged above the interface for the microscope body and below the tube carrier for the principal observer's tube is very generally useful.

In a further aspect of the invention, a zero-degree assistant's device for a microscope is proposed, having a tube carrier for a principal observer's tube, an interface for the microscope body, an interface for documentation accessories, and having an assistant's module having an interface for an assistant's tube, the assistant's module being embodied in such a way that at least a portion of the optical beam path entering the assistant's module is capable of being coupled out and conveyed to the interface for documentation accessories.

Be it noted that this aspect of the invention is implementable and advantageous in particular together with the first aspect of the invention. On the other hand, the second aspect of the invention can also be implemented separately from the first aspect. According to a second aspect of the invention, the documentation module cited initially is practically integrated into the assistant's module. The assistant's module possesses an interface for documentation accessories; once again, the term "interface" is to be understood in a general sense, thus also encompassing a fixed connection or an integral embodiment of the documentation accessories and assistant's module.

The advantages of the second aspect of the invention are that if the assistant changes sides while the microscope is in use, the documentation accessories or a documentation module do not need to be disassembled and later reinstalled, since it constitutes a single unit with the assistant's module. A further advantage is the lower overall height of the arrangement as compared with known microscopes, since integration of the documentation module into the assistant's module results in little or no increase in overall height in the direction of the optical axis, and at the same time a separate documentation module (approx. 40 mm high) is eliminated.

It is particularly advantageous to use a rotatable assistant's module according to a first aspect of the invention that is equipped with an interface for documentation accessories according to a second aspect of the invention.

It is particularly advantageous to use a stereomicroscope as a surgical microscope, in order to allow a highly magnified three-dimensional view of a surgical procedure. For this purpose, the interface for the assistant's tube is configured for a binocular tube, the two associated beam paths in the assistant's module preferably being capable of being at least in part coupled out by means of beam splitters, and at least one of the outcoupled beam paths being conveyable via further optical elements to the interface for documentation accessories. With a suitable arrangement of optical elements, both outcoupled beam paths can be conveyed to the interface for documentation accessories for documentation purposes. A symmetrical outcoupling of the two beam paths for documentation purposes is preferred, so that in a first position of the assistant's module one of the outcoupled beam paths is conveyed to the interface for documentation accessories, and in the other position of the assistant's module the other outcoupled beam path is conveyed to said interface. Because in all cases both beam paths are always at least in part outcoupled by means of beam splitters, the brightness in the assistant's module for the left and the right beam path remains the same in both positions.

As already mentioned, a combination of the two aspects of the invention results in a combination of the advantages of free pivotability of the assistant's module without disassembly of microscope components, and low overall height because of the integration of the documentation module and assistant's module. It is advantageous here if the interface for documentation accessories is at a point on the assistant's device that lies outside the pivot range of the assistant's module. If the pivot range is from 0 to 180 degrees, that interface is then advantageously located in the range beyond 180 degrees and less than 360 degrees. That interface is located, in particular, opposite the principal observer's tube, i.e. at approximately 270 degrees in the example cited (see also FIGS. 1A and 1B).

BRIEF DESCRIPTION OF THE DRAWINGS

The invention and its advantages will be explained in more detail below with reference to exemplifying embodiments illustrated in the Figures, in which.

DETAILED DESCRIPTION OF THE INVENTION

Figure 1A:
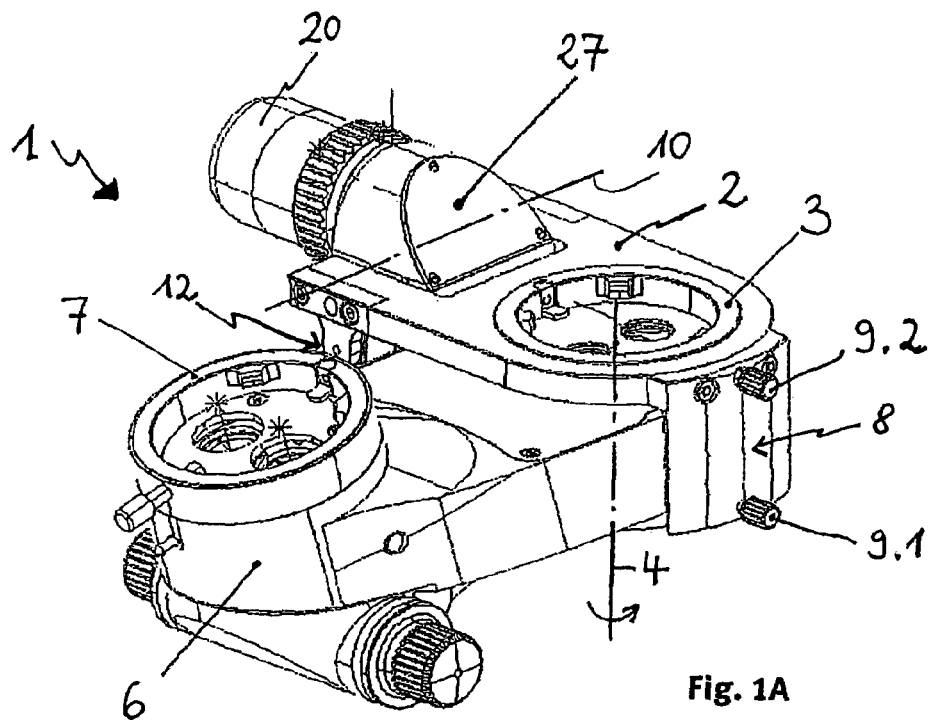
FIG. 1A is a perspective view showing a zero-degree assistant's device according to the present invention in a working position.

FIG. 1A shows a zero-degree assistant's device 1 that substantially comprises the following components: the rotatable or pivotable assistant's module 6, tube carrier 2, as well as first retaining device 8 and second retaining device 12. In accordance with a second aspect of the invention, interface 20 for documentation accessories is integrated into assistant's device 1. Zero-degree assistant's device 1 accordingly comprises a documentation part 27. Tube carrier 2 contains an interface 3 for the principal observer's tube; assistant's module 6 in turn comprises an interface 7 for the assistant's tube. Retaining device 8 contains two captive screws 9.1 and 9.2; by way of screw 9.1, tube carrier 2 itself can be secured in interface 5 for the microscope body by the engagement of screw 9.1, while screw 9.2 secures, for example, the principal observer's tube, a filter module, or an inverter on the tube carrier.

FIG. 1A shows zero-degree assistant's device 1 with assistant's module 6 in a working position. First retaining device 8 secures the rotatable assistant's module 6 in its zero-degree position. The Figure shows further optional details, namely the configuration of interfaces 3 and 7 for binocular tubes, and the manner of connecting the tubes via the so-called interfaces in the form of dovetail connections. As already repeatedly emphasized, the invention is not limited to the instances mentioned. In particular, principal observer's and/or assistant's tubes immovably connected to assistant's device 1 can also be used.

In the embodiment shown, the first retaining device 8 is fixedly connected to the tube carrier 2 for the principal observer's tube, rotation of that tube carrier into a tilted position being possible only after releasing a retaining system on the retaining device. In this embodiment, consequently, in order to pivot the assistant's module 6 firstly the retaining system on the retaining device 8 is released, then the tube carrier for the principal observer's tube is rotated into a tilted position, and lastly the assistant's module is pivoted about the pivot axis within a predetermined angle range, preferably 180°.

With this configuration it is advisable if the retaining system on the first retaining device is embodied as retaining screw 9.1 that engages into the interface 5 for the microscope body. The first retaining device 8 thus forms a kind of clamp that, in the retained state, connects the tube carrier 2 to the interface 5 for the microscope body. The clamp usefully fits around the assistant's module 6, which in turn is secured when the retaining system is immobilized or the retaining screw is tightened. A stop against which the assistant's module 6 makes contact can be provided for this purpose, the assistant's module being securable in this position by means of the first retaining device 8.

The optical axis about which assistant's module 6 is rotatable is labeled 4. If the assistant changes sides, assistant's module 6 can be pivoted, from the position in FIG. 1A, 180 degrees to the right (and back again). To do so, firstly first retaining device 8 is released by unscrewing retaining screw 9.1, thus releasing retaining device 8 from interface 5 for the microscope body. Tube carrier 2, which is connected to retaining device 8, is then tilted upward (see FIG. 1B).

Figure 1B:
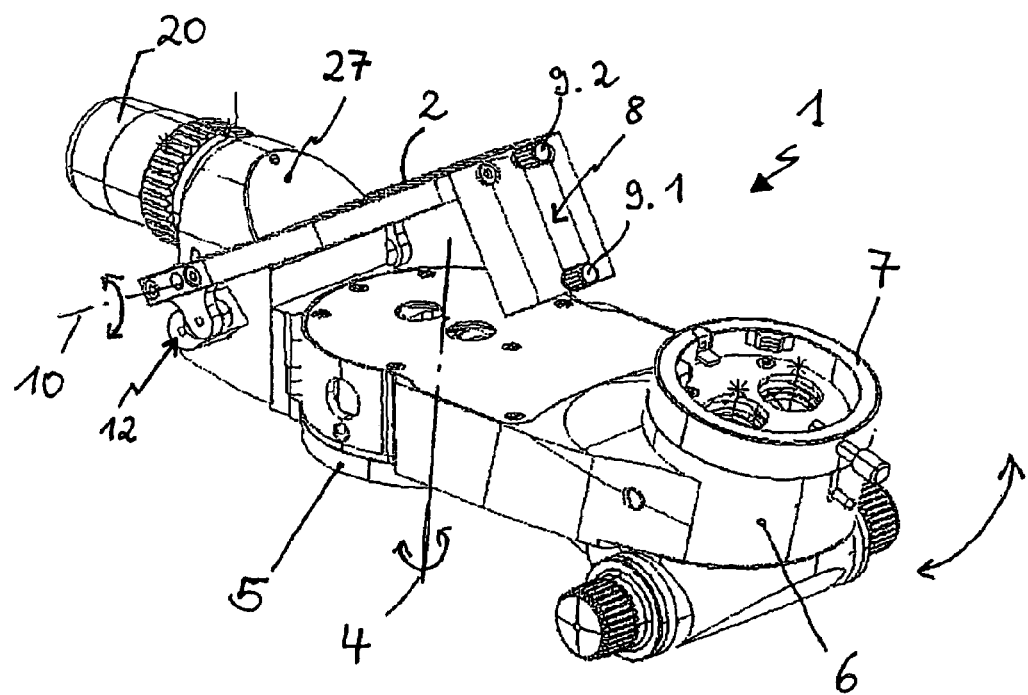
FIG. 1B is a perspective view showing the zero-degree assistant's device of FIG. 1A in an adjustment position wherein the tube carrier is tilted and the assistant's module is pivoted.

As is apparent from FIG. 1B, tube carrier 2 is mounted rotatably about a rotation axis 10. FIG. 1B shows the location of tube carrier 2 in its tilted position in which, while the microscope is in use, the principal observer's tube is moved out of the pivot range of the assistant's tube so that pivoting can occur with no risk of collision.

As is further evident from FIG. 1B, zero-degree assistant's device 1 comprises an interface 5 to the microscope body or surgical microscope. Documentation part 27 engages onto interface 5 to the microscope body, and conveys a portion of the outcoupled beam paths to interface 20 for documentation accessories, e.g. for a video zoom adapter, digital camera, etc. Also engaging onto interface 5 for the microscope body are interface 3 for the principal observer's tube, and interface 7 for the assistant's tube. Tube carrier 2 connects, at its interface 3, the accessories for the principal surgeon, e.g. laser filter, inverter for the beam paths, and tube. Interface 7 is used for the assistant's accessories, e.g. once again laser filter, converter, and assistant's tube.

FIG. 1B is a "snapshot" of the pivoting of assistant's module 6 180 degrees to the right with reference to FIG. 1A. Assistant's module 6 is rotated to the right until it stops, then tube carrier 2 is pivoted toward until it stops, then first retaining device 8 is once again immobilized. Be it noted in this connection that retention can also be performed automatically (e.g. by clicking into place) once pivoting has occurred.

As is apparent from FIGS. 1A and 1B, documentation part 27 remains secured in position during the pivoting of assistant's module 6.

Interface 3 for the principal observer's tube is not visible in FIG. 1B because of the perspective view. It is also apparent from FIG. 1B that first retaining device 8 connected to tube carrier 2 can be swung down only when assistant's module 6 is in its final (180-degree) position.

In the exemplifying embodiment according to FIGS. 1A and 1B, a second retaining device 12 is also provided. This second retaining device is located substantially in the interior of the housing and is connected to a portion of tube carrier 2 that is located on rotation axis 10. As will be explained in detail below, this second retaining device 12 has the function of a locking mechanism, which locks the assistant's module and thus makes any pivoting thereof impossible as long as tube carrier 2 is not in a defined tilted position. Assistant's module 6 is thus, in the embodiment according to FIGS. 1A and 1B, protected in two ways against unintentional pivoting: on the one hand, retaining device 8 must be released (by releasing retaining screw 9.1); on the other hand, tube carrier 2 must be brought into a defined tilted position before any pivoting of assistant's module 6 is possible. Be it noted, however, that the second retaining device may be sufficient even without the presence of first retaining device 1. In that case the tube carrier would need to be brought into the aforementioned defined tilted position before pivoting of the assistant's module can be effected. If the tube carrier is not in that defined tilted position, it is advisable to lock assistant's module 6 using interface 5 for the microscope body.

FIGS. 2A through 2D show an advantageous embodiment of a detail of a zero-degree assistant's device according to the present invention in which a locking mechanism 12 is implemented.

Figure 2A:
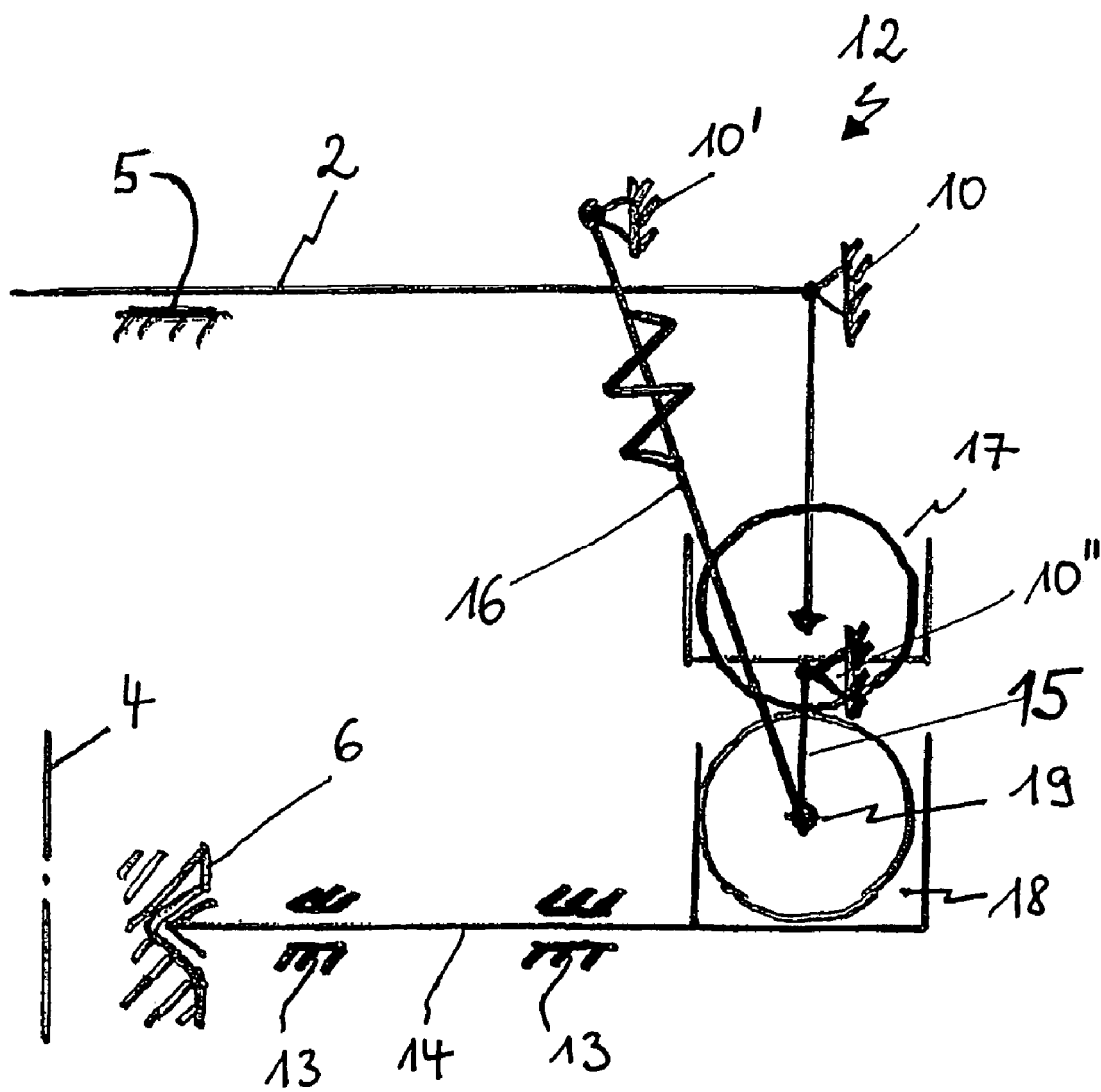
FIG. 2A shows an embodiment of a locking mechanism of the zero-degree assistant's device in an initial locked position.

FIG. 2A schematically shows one possible locking mechanism 12 with which assistant's module 6 can be secured, for example, in its zero-degree and its 180-degree position. The locking system is automatically released upon upward rotation of tube carrier 2, and upon downward rotation of tube carrier 2 the locking system automatically engages, an operation that is schematically depicted in FIGS. 2A through 2D in one possible embodiment. FIG. 2A depicts the initial position in which tube carrier 2 is resting on the interface 5, being mounted rotatably about rotation axis 10. A first ball bearing 17 is rigidly connected to tube carrier 2. Engaging on the other side is a locking bolt 14 that is guided, via a translation axis 13 in documentation part 27, into a corresponding recess in assistant's module 6. The optical axis about which assistant's module 6 is rotatable is once again labeled 4. The depiction of FIGS. 2A through 2D is a lateral section, containing optical axis 4, through tube carrier 2 and documentation part 27 of FIGS. 1A and 1B.

Also visible is a second ball bearing 18 that is connected to locking bolt 14, shaft 19 of this ball bearing 18 being connected to a tension spring 16 that in turn is mounted on a rotary shaft 10' in documentation part 27. Shaft 19 itself is connected rigidly, via lever 15, to a further rotary shaft 10" in documentation part 27. Other rotary bearings can also be used instead of the aforesaid ball bearings.

Figure 2B:
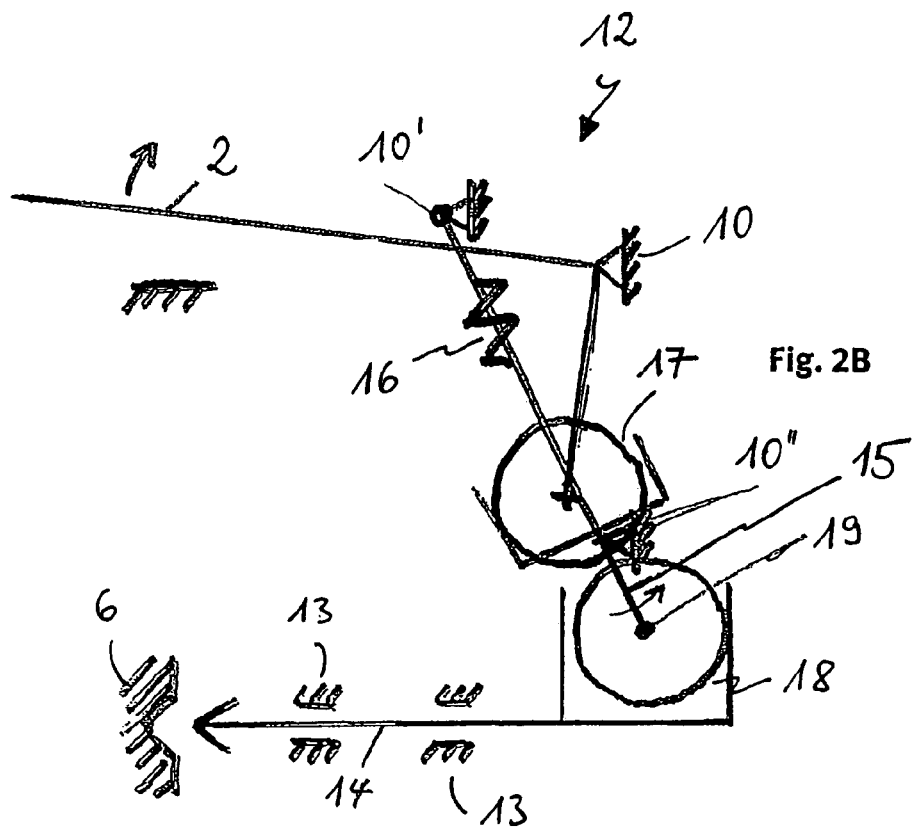
FIG. 2B shows the locking mechanism of FIG. 2A in a different position as a tube carrier of the zero-degree assistant's device is tilted upward.

In the initial situation as shown in FIG. 2A, assistant's module 6 is locked to interface 5 for the microscope body. Tension spring 16 pushes locking bolt 14, via lever 15, into the corresponding recess in assistant's module 6 (indicated by the arrow engaging into the recess). Proceeding from this locked position, unlocking can be initiated by upward rotation of tube carrier 2. FIG. 2B shows the situation with tube carrier 2 lifted up; upon upward rotation of tube carrier 2, locking bolt 14 is displaced via lever 15 to the right (as viewed in FIG. 2B), in positively engaged fashion, until spring attachment point 19 on lever 15 rotates beyond the tilting point. Spring attachment points 19', 10' and rotation point 10" of lever 15 now lie on a straight line.

As is evident from FIGS. 2A and 2B, a lifting of tube carrier 2 causes a leftward displacement of first ball bearing 17 and a rightward motion of second ball bearing 18. Upon further lifting of tube carrier 2, tension spring 16 pulls locking bolt 14 non-positively, via lever 15, farther out of the locked position. The purpose of this design is to execute unlocking quickly and completely after upward tilting of tube carrier 2 through an angle of 5 to 10 degrees, preferably approximately 8 degrees.

Figure 2D:
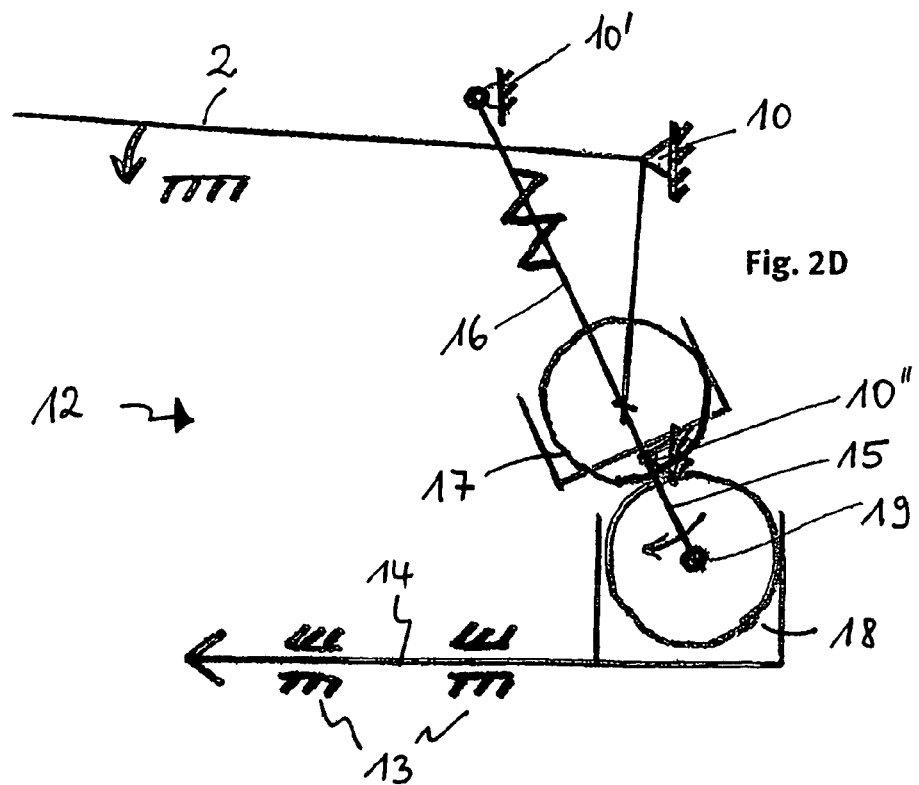
FIG. 2D shows the locking mechanism of FIG. 2A in a position similar to that of FIG. 2B as the tube carrier is tilted downward from the tilt limit shown in FIG. 2C.
Figure 2C:
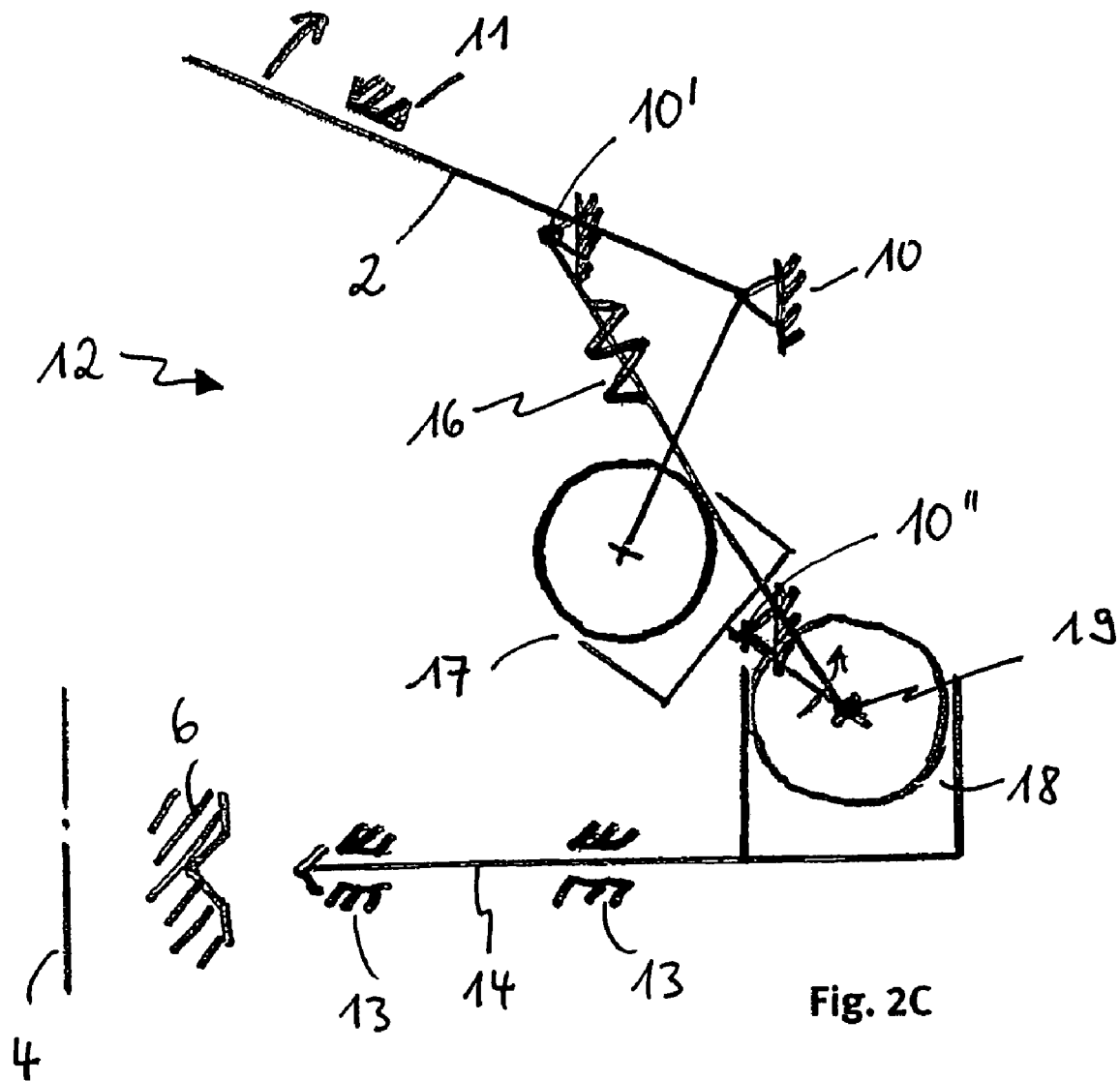
FIG. 2C shows the locking mechanism of FIG. 2A in yet another position as the tube carrier reaches an upward tilt limit.

FIG. 2C illustrates the situation in which tube carrier 2 has been tilted upward to stop 11. In this embodiment, tube carrier 2 can be tilted upward by as much as approximately 30 degrees, and assumes a stable position in that position. Locking mechanism 12 that is depicted allows for stable positions of locking bolt 14 in the locked position (cf. FIG. 2A) and in the unlocked position as shown in FIG. 2C.

FIG. 2D corresponds substantially to what is depicted in FIG. 2B, the opposite case (tube carrier 2 being rotated downward) being depicted here. The result of the design depicted here is that locking is initiated only at an angle of less than 5 degrees (in this case approximately 4 degrees) before the bottom stop point of tube carrier 2. Initiation occurs at the moment spring attachment points 19 and 10' and rotation point 10" of lever 15 lie on a straight line. To ensure that no malfunctions occur with regard to locking, locking mechanism 12 is designed in such a way that tube carrier 2 cannot arrive at the aforesaid 4-degree angle until assistant's module 6 is at its right- or left-hand stop (i.e. in its zero-degree or 180-degree position). If that is not the case, tube carrier 2 cannot arrive at the 4-degree tilt angle, since it would contact assistant's module 6.

Advantageously provided in the zero-degree assistant's device according to the present invention as the second retaining device 12, in addition to the first retaining device 8, is a locking mechanism that disengages the assistant's module 6 only upon tilting of the tube carrier 2 for the principal observer's tube into a tilted position or beyond a predetermined tilt angle, and otherwise locks the assistant's module. The second retaining device 12 is consequently in working engagement with the tube carrier 2 in such a way that disengagement of the assistant's module 6 is accomplished only after the tube carrier 2 is tilted into a defined tilted position. This represents an additional safety measure to prevent unintentional pivoting of the assistant's module 6, since in this case, in order to pivot the assistant's module, firstly the first retaining device 8 must be released and then the tube carrier 2 must be brought into a defined tilted position.

As already mentioned, the aforesaid second retaining device 12 can be implemented in the context of the zero-degree assistant's device independently of the first retaining device 8. The second retaining device is usefully embodied in such a way that it locks or disengages the assistant's module 6, the second retaining device 12 being in working engagement with the tube carrier 2 for the principal observer's tube in such a way that such locking or disengagement is determined by the position or the tilt angle of the tube carrier 2. It is advisable in this context if a disengagement of the assistant's module 6 is accomplished exclusively in a defined tilted position of the tube carrier 2, while the assistant's module 6 remains locked in all other positions of the tube carrier. The second retaining device 12 thus represents a locking mechanism that is operated by way of the tiltable tube carrier 2.

It is useful in this context if the second retaining device 12 is embodied in such a way that it respectively locks the assistant's module 6 to the interface 5 for the microscope body and releases the assistant's module from the interface for the microscope body.

It should be emphasized again that the second retaining device 12 described here can be used in the context of the zero-degree assistant's device according to the present invention without, but also in combination with, the above-described first retaining device 8.

It proves to be advantageous if the second retaining device 12 is embodied in such a way that release of the assistant's module 6 occurs upon rotation of the tube carrier 2 about its tilt axis through a specific tilt angle, that release being maintained upon further rotation, i.e. upon an increase in the tilt angle. For example, if the tiltable range of the tube carrier is 30 degrees, release of the assistant's module can occur, for example, in an angle range from approximately 10 to 30 degrees, whereas locking occurs for smaller angles. In the converse case, i.e. when the tube carrier (after pivoting of the assistant's module) is rotated back into its initial position, it may be useful to perform locking at the same tilt angle (at approx. 10 degrees, in the present example), or else at a different tilt angle. The locking mechanism can be configured, for example, in such a way that in the example mentioned here, locking occurs only at about 5 degrees as the tube carrier 2 is rotated back.

In practice, it is useful and sufficient if the assistant's module 6 is pivotable through 180 degrees, a pivotability between two positions, specifically at zero degrees and at 180 degrees, being preferred in terms of design engineering. For that purpose, the assistant's device can be embodied in such a way that the first and/or second retaining device performs an immobilization of the assistant's module only in the aforesaid two positions.

The necessary magnitude for tilting of the tube carrier 2 for the principal observer's tube into the tilted position depends substantially on the configuration of the principal observer's tube and on that of the assistant's tube itself. What is essential is that the tilting occur to a sufficient extent that the assistant's module, together with the assistant's tube, can be pivoted with no risk of collision. Tilt angles in the range from 10 to 90 degrees, in particular tilt angles of 20, 25, 30, 35, 40, and 45 degrees, have proven suitable in practice. A tilting capability from 30 to 40 degrees is generally sufficient.

Figure 3:
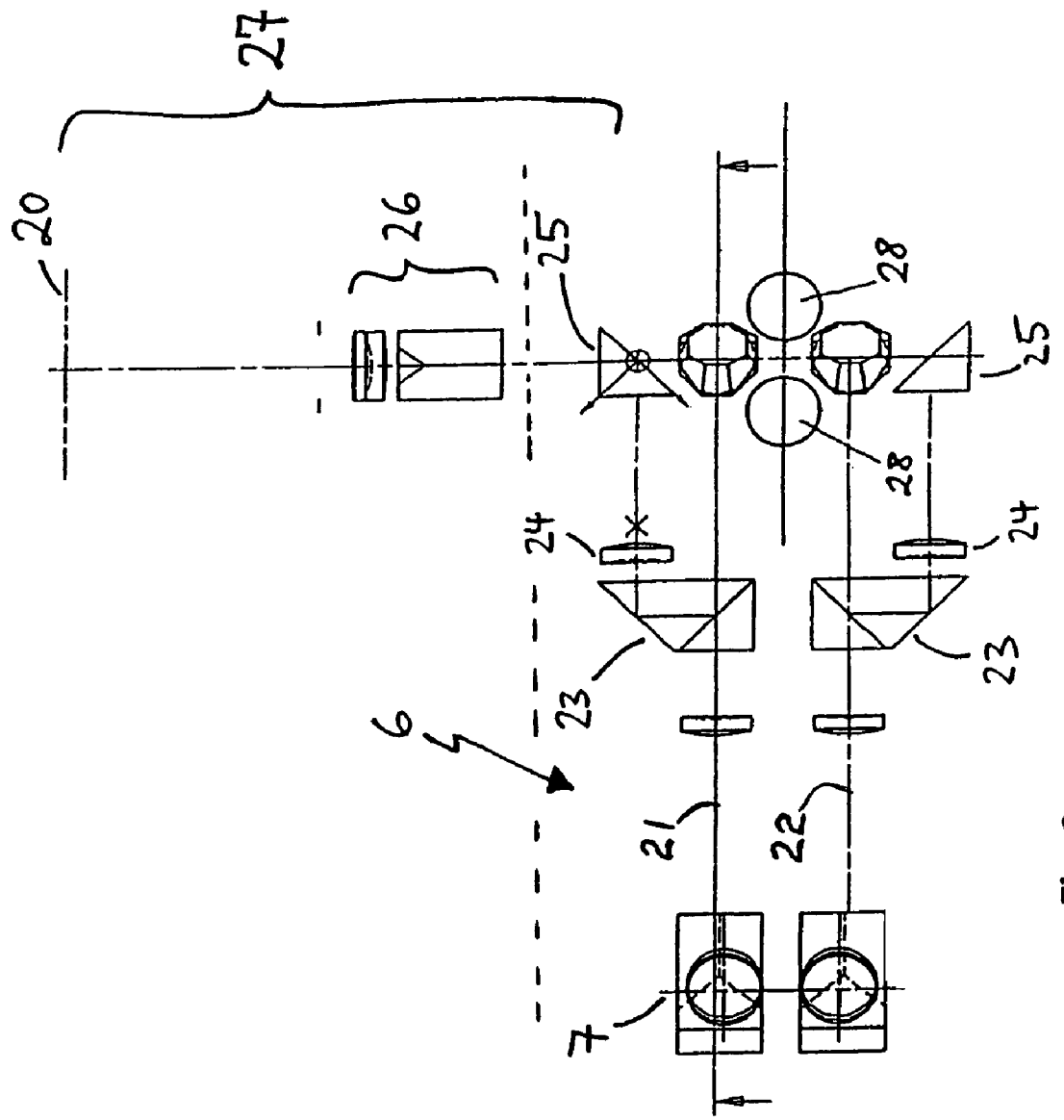
FIG. 3 is an optical schematic diagram showing integration of an accessory interface into the assistant's device according to the present invention.

FIG. 3 is a schematic design sketch, in plan view, of an assistant's module 6 according to the present invention combined with a documentation part 27, as also depicted in perspective in FIGS. 1A and 1B. An important point is that the overall height between interface 5 to the microscope body and interface 3 on tube carrier 2 for the principal observer's tube be kept as low as possible, in order to minimize any possible vignetting for the principal observer. In the embodiment depicted, this can be achieved by keeping the beam path in assistant's module 6 in one plane to the greatest extent possible, and additionally by shortening the optical path in the region of said overall height by introducing plane-parallel plates 28 (see FIG. 3).

FIG. 3 clearly illustrates the outcoupling of the two beam paths 21, 22 that are conveyed to the assistant's binocular tube or to interface 7 for the assistant's tube. A portion of these beam paths is coupled out via beam splitter 23. The outcoupled beam is conveyed via further optical elements—a lens 24 and a deflection prism 25 being depicted here—to a fixed front-end interface optical system 26. This fixed front-end optical system 26 is located in documentation part 27 (cf. FIGS. 1A and 1B). As shown in FIG. 3, the upper beam path 21 is partly outcoupled and delivered to interface 20 for documentation accessories. A portion of the lower beam path 22 is likewise outcoupled, so that the brightness in interface 7 for the assistant's tube is the same in both optical channels. Upon a 180-degree rotation of assistant's module 6, the elements depicted on the lower side in FIG. 3, such as beam splitter 23 and deflection prism 25, are activated, so that now the latter elements handle the outcoupling for documentation purposes. To ensure precise incoupling of the outcoupled beam path into fixed front-end optical system 26, positive locking of assistant's module 6, as effected by locking mechanism 12 discussed in connection with FIGS. 2A through 2D and by first retaining device 8 having corresponding stops (in the zero-degree and 180-degree positions) for the assistant's module, is extremely advantageous.

PARTS LIST

1 Zero-degree assistant's device
2 Tube carrier for principal observer's tube
3 Interface for principal observer's tube
4 Axis about which assistant's module is pivotable
5 Interface for microscope body
6 Assistant's module
7 Interface for assistant's tube
8 First retaining device
9.1 Retaining system, retaining screw
9.2 Retaining system, retaining screw
10 Rotation axis for tube carrier 2
10' Spring attachment point, rotary shaft
10" Rotary shaft for lever 5
11 Stop
12 Second retaining device, locking mechanism
13 Translation axis
14 Locking bolt
15 Lever
16 Tension spring
17 Ball bearing
18 Ball bearing
19 Spring attachment point, bearing shaft
20 Interface for documentation accessories
21 Optical beam path
22 Optical beam path
23 Beam splitter
24 Lens
25 Prism
26 Front-end interface optical system
27 Documentation part
28 Plane-parallel plates

What is claimed is:

1. A zero-degree assistant's device for a microscope, the device comprising:
   a microscope body interface (5) for mounting the zero-degree assistant's device on a microscope body;
   a tube carrier (2) for a principal observer's tube, the tube carrier (2) being mounted on the microscope body interface (5) for rotation about a tilt axis (10) relative to the microscope body interface (5) between a working position and an adjustment position; and
   an assistant's module (6) including an interface (7) for an assistant's tube, the assistant's module being pivotable about a pivot axis (4) relative to the microscope body interface (5) through at least 180 degrees when the tube carrier (2) is tilted about the tilt axis (10) to the adjustment position.

2. The zero-degree assistant's device according to claim 1, further comprising a retaining device (8) fixedly connected to the tube carrier (2) and having a retaining screw (9.1) thereon for selectively engaging the microscope body interface (5).

3. The zero-degree assistant's device according to claim 2, wherein tilting of the tube carrier (2) is enabled by disengaging the retaining screw (9.1) from the microscope body interface (5).

4. The zero-degree assistant's device according to claim 2, wherein the assistant's module (6) is pivotable about the pivot axis (4) through 180 degrees, and the assistant's module (6) can be immobilized by the retaining device (8) and retaining screw (9.1) at a zero-degree position and at a 180-degree position.

5. The zero-degree assistant's device according to claim 1, further comprising a locking mechanism (12) that disengages the assistant's module (6) for pivoting only upon tilting of the tube carrier (2) beyond a predetermined tilt angle, and otherwise locks the assistant's module (6) against pivoting.

6. The zero-degree assistant's device according to claim 5, wherein the locking mechanism (12) locks the assistant's module (6) to the microscope body interface (5).

7. The zero-degree assistant's device according to claim 5, wherein the assistant's module (6) is pivotable about the pivot axis (4) through 180 degrees, and the assistant's module (6) can be immobilized by the locking mechanism (12) at a zero-degree position and at a 180-degree position.

8. The zero-degree assistant's device according to claim 1, wherein the assistant's module (6) is arranged beneath the tube carrier (2); and the tube carrier (2) is tiltable in an upward direction to the adjustment position.

9. The zero-degree assistant's device according to claim 1, wherein the tube carrier (2) can be tilted about the tilt axis (10) through an angle that is selected from the group of angles of consisting of 20, 25, 30, 35, 40, and 45 degrees.

10. The zero-degree assistant's device according to claim 1, further comprising an accessory interface (20) for mounting documentation accessories, wherein the accessory interface (20) is located outside a pivot range of the assistant's module (6).

11. The zero-degree assistant's device according to claim 1, further comprising:
   a documentation part (27) connected to the microscope body interface (5), the documentation part (27) including an accessory interface (20) for a documentation accessory,
   wherein the assistant's module (6) further includes a pair of optical beam paths (21, 22), and at least a portion of the pair of optical beam paths is coupled out from the assistant's module (6) and conveyed to the accessory interface (20).

12. The zero-degree assistant's device according to claim 11, wherein the interface (7) for the assistant's tube is configured for receiving a binocular tube, and the assistant's module (6) includes a pair of beam splitters (23) one in each optical path (21, 22) for coupling out the pair of optical paths (21, 22).

13. The zero-degree assistant's device according to claim 12, wherein the assistant's module (6) further includes additional optical elements (24, 25) after each beam splitter (23) for conveying an outcoupled beam path, and the documentation part (27) includes a front-end interface optical system (26) with which an outcoupled beam path is alignable for conveying the outcoupled beam path to the accessory interface (20).

14. The zero-degree assistant's device according to claim 11, wherein the accessory interface (20) is located outside a pivot range of the assistant's module (6).

* * * * *